(12) United States Patent
Herzog et al.

(10) Patent No.: US 10,544,706 B2
(45) Date of Patent: Jan. 28, 2020

(54) SINGLE SHAFT COMBINED CYCLE POWER PLANT SHAFT ARRANGEMENT

(71) Applicant: GENERAL ELECTRIC TECHNOLOGY GMBH, Baden (CH)

(72) Inventors: Maurus Herzog, Oberrohrdorf (CH); Hubert Kujawski, Ehrendingen (CH); Abhimanyu Gupta, Nussbaumen (CH); Suman Ray, Wettingen (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 561 days.

(21) Appl. No.: 15/019,509

(22) Filed: Feb. 9, 2016

(65) Prior Publication Data

US 2016/0230608 A1 Aug. 11, 2016

(30) Foreign Application Priority Data

Feb. 10, 2015 (EP) .................................... 15154480

(51) Int. Cl.
| | |
|---|---|
| *F01K 23/02* | (2006.01) |
| *F01K 23/12* | (2006.01) |
| *F01K 23/16* | (2006.01) |
| *F01K 23/10* | (2006.01) |
| *F22B 1/18* | (2006.01) |
| *F01K 23/00* | (2006.01) |

(52) U.S. Cl.
CPC ............. *F01K 23/16* (2013.01); *F01K 23/00* (2013.01); *F01K 23/02* (2013.01); *F01K 23/10* (2013.01); *F01K 23/12* (2013.01); *F22B 1/1815* (2013.01); *Y02E 20/16* (2013.01)

(58) Field of Classification Search
CPC .... F01K 23/12–16; F01K 23/10; F01K 23/00; Y02E 20/16; F02C 6/18; F22B 1/1815
See application file for complete search history.

(56) References Cited

U.S. PATENT DOCUMENTS

| | | | | |
|---|---|---|---|---|
| 3,362,514 A | * | 1/1968 | Clements | ................ F16D 23/10 192/110 R |
| 4,476,674 A | | 10/1984 | Berman | |
| 4,961,310 A | * | 10/1990 | Moore | ................... F01D 25/162 415/213.1 |
| 5,199,256 A | * | 4/1993 | Moore | .................... F01D 13/00 60/39.182 |

(Continued)

FOREIGN PATENT DOCUMENTS

| | | |
|---|---|---|
| EP | 2 647 841 A1 | 10/2013 |
| EP | 2 700 790 A1 | 2/2014 |

(Continued)

OTHER PUBLICATIONS

European Search Report dated Jul. 29, 2015.

*Primary Examiner* — Scott J Walthour
*Assistant Examiner* — Todd N Jordan
(74) *Attorney, Agent, or Firm* — Grogan, Tuccillo & Vanderleeden, LLP

(57) ABSTRACT

A single shaft combined cycle power plant includes a shaft on which is sequentially located, a gas turbine, a medium pressure steam turbine, a low pressure steam turbine, a generator, and a high pressure steam turbine, wherein the gas turbine and the high pressure steam turbine are at opposite ends of the shaft.

1 Claim, 1 Drawing Sheet

(56) References Cited

U.S. PATENT DOCUMENTS

| | | | | |
|---|---|---|---|---|
| 5,347,814 A * | 9/1994 | Kemmer | ............... | F01K 7/22 |
| | | | | 60/676 |
| 5,780,932 A * | 7/1998 | Laffont | ............... | F01D 25/28 |
| | | | | 290/2 |
| 8,525,362 B2 * | 9/2013 | Herzog | ............... | F01K 17/04 |
| | | | | 290/52 |
| 2013/0255254 A1 | 10/2013 | Ehrsam et al. | | |
| 2016/0047307 A1 * | 2/2016 | Williamson | ............ | F01D 15/10 |
| | | | | 290/52 |

FOREIGN PATENT DOCUMENTS

| | | |
|---|---|---|
| FR | 2 528 493 A1 | 12/1983 |
| JP | 58-9543 A | 1/1983 |

\* cited by examiner

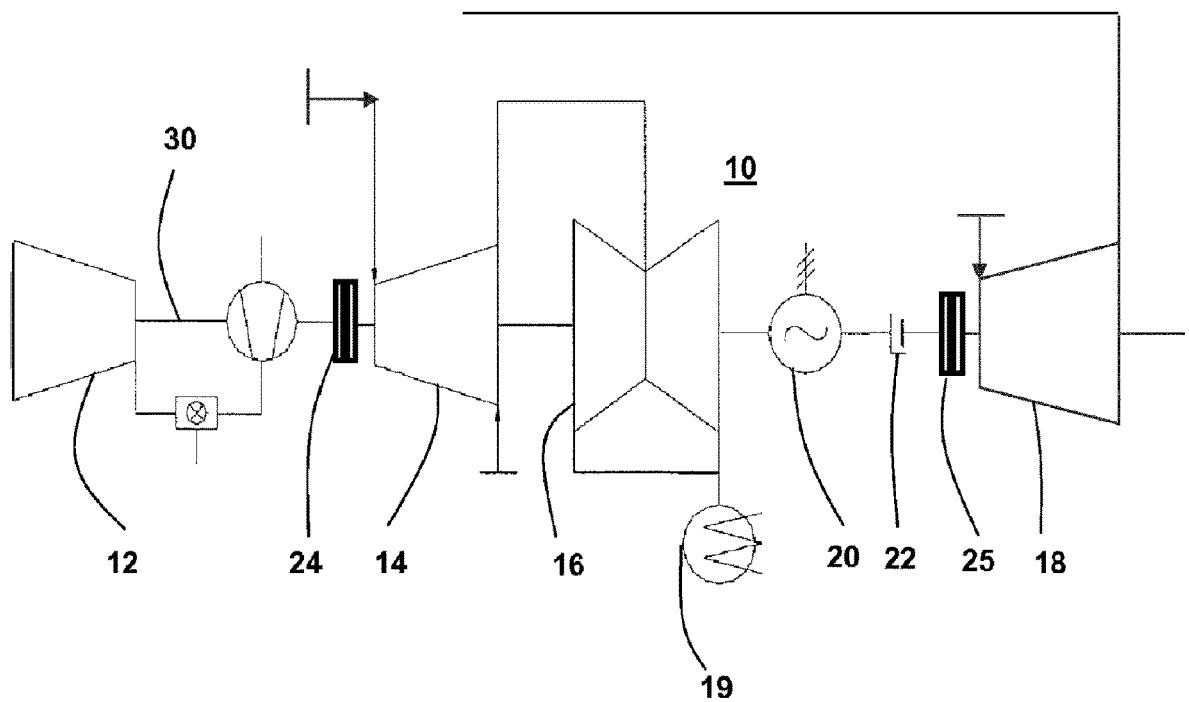

SINGLE SHAFT COMBINED CYCLE POWER PLANT SHAFT ARRANGEMENT

TECHNICAL FIELD

The present disclosure relates generally to single shaft combined cycle power plants and more specifically to turbine shaft arrangements that are in particularly suitable for large capacity turbines.

BACKGROUND INFORMATION

In combined cycle single shaft power plants a key parameter in determining the optimum arrangement of turbines and generator on the shaft involves consideration of shaft torque, the layout and configuration of a heat recovery steam generator, that is typical component of a combined cycle power plant, as well a civil footprint.

With the availability of larger gas turbines limitations may be placed on existing clutches and bearing components and thus may result in a new need to find alternate turbine shaft arrangements.

A solution involves locating a steam turbine train between a gas turbine and generator. The limitations of this solution is that high torque is transmitted through the high pressure steam turbine.

Another solution involves locating a generator between a gas turbine and steam turbine and fitting a synchro-self-shifting clutch there between. For some installation, such clutches may not be available.

SUMMARY

A turbine arrangement of a single shaft combined cycle power plant, is provided that can at least provide an alternative configuration for large, high power output turbines where because of mechanical limitations on synchro-self-shifting clutch or generator exciter shaft it may be desirable to limit power transmitted through a synchro-self-shifting clutch or generator exciter shaft from the shaft arrangement.

It attempts to address this problem by means of the subject matter of the independent claims. Advantageous embodiments are given in the dependent claims.

In an aspect a single shaft combined cycle power plant comprises a shaft on which is sequentially located, a gas turbine, a medium pressure steam turbine, a low pressure steam turbine, a generator and exciter shaft and a high pressure steam turbine.

A further aspect comprises a first thrust bearing on the shaft between the gas turbine and the medium pressure steam turbine. A second thrust bearing on the shaft between the generator-exciter and the high pressure steam turbine is also positioned and needs flexible coupling in between in order to compensate for thermal expansions. This aspect is expected to require an auxiliary boiler for start-up of the steam turbines.

The flexible coupling could be replaced by a relatively smaller size synchro-self-shifting clutch along with relatively smaller auxiliary boiler for start-up of a medium pressure steam turbine, a low pressure steam turbine Other aspects and advantages of the present disclosure will become apparent from the following description, taken in connection with the accompanying drawings, which by way of example, illustrate exemplary embodiments of the present invention.

BRIEF DESCRIPTION OF THE DRAWINGS

By way of example, an embodiment of the present disclosure is described more fully hereinafter with reference to the accompanying drawings, in which:

FIG. 1 is a schematic of a single shaft combine combined cycle power plant according to an exemplary embodiment of the disclosure.

DETAILED DESCRIPTION

Exemplary embodiments of the present disclosure are now described with references to the drawing, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

Throughout the description the pressure designation of a steam turbine defines its relative inlet volumetric flow. As such, high pressure steam turbine 18 has a lower relative inlet volumetric flow than a medium pressure steam turbine 14, which in turn has a lower inlet volumetric flow than a low pressure steam turbine 16.

FIG. 1 shows an exemplary embodiment of a single shaft combined cycle power plant 10. On the shaft 30 there is a gas turbine 12, a medium pressure steam turbine 14, a low pressure steam turbine 16, a generator 20 and a high pressure steam turbine 18, located sequentially on the shaft 30. In this context, sequential means that the medium pressure steam turbine 14 is between the gas turbine 12 and the low pressure steam turbine 16, the low pressure steam turbine 16 is between the medium pressure steam turbine 14 and the generator 20, the generator 20 is between the low pressure steam turbine 16 and the high pressure steam turbine 18, while the gas turbine 12 and the high pressure steam turbine 18 are at either ends of the shaft 30.

In a further exemplary embodiment, a thrust bearing 24 is located on the shaft 30 between the gas turbine 12 and the medium pressure steam turbine 14 while another thrust bearing 25 is located on the shaft 30 between the generator 20 and the high pressure steam turbine 18.

In another exemplary embodiment, a flexible coupling 22 is located on the shaft 30 between the generator 20 and the high pressure steam turbine 18 and/or between the generator 20 and the second thrust bearing 25.

Although the disclosure has been herein shown and described in what is conceived to be the most practical exemplary embodiment, the present disclosure can be embodied in other specific forms. For example, the combined cycle power plant may include additional steam turbines that are not located on the single shaft and as such, the high pressure steam turbine 18 may or may not be the highest pressure steam turbine located in the combined cycle power plant. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

REFERENCE NUMBERS 10 combined cycle power plant
12 gas turbine

14 high pressure steam turbine
16 medium pressure steam turbine
18 low pressure steam turbine
19 condenser
20 generator
22 flexible coupling
24,25 thrust bearing
30 shaft

The invention claimed is:

1. A single shaft combined cycle power plant comprising a shaft on which is sequentially located:
   a gas turbine;
   a first thrust bearing;
   a medium pressure steam turbine;
   a low pressure steam turbine;
   a generator;
   a flexible coupling;
   a second thrust bearing;
   and a high pressure steam turbine;
   wherein the gas turbine and the high pressure steam turbine are at opposite ends of the shaft.

* * * * *